(12) United States Patent
Murakami

(10) Patent No.: US 7,691,273 B2
(45) Date of Patent: Apr. 6, 2010

(54) METHOD FOR THE CLARIFICATION OF SLUDGE

(76) Inventor: Seishiro Murakami, 1899, Takagi, Mihune-mati, Kamimashiki-gun, Kumamoto, 861-3203 (JP)

( * ) Notice: Subject to any disclaimer, the term of this patent is extended or adjusted under 35 U.S.C. 154(b) by 393 days.

(21) Appl. No.: 10/590,018

(22) PCT Filed: Feb. 17, 2005

(86) PCT No.: PCT/JP2005/002962

§ 371 (c)(1),
(2), (4) Date: Jun. 20, 2007

(87) PCT Pub. No.: WO2005/080275

PCT Pub. Date: Sep. 1, 2005

(65) Prior Publication Data

US 2008/0017587 A1 Jan. 24, 2008

(30) Foreign Application Priority Data

Feb. 19, 2004 (JP) .................... 2004-042653

(51) Int. Cl.
*C02F 1/48* (2006.01)
*C02F 1/78* (2006.01)

(52) U.S. Cl. ............... 210/748.1; 210/748.16; 210/760; 210/764; 210/172.1; 210/199; 210/202; 210/203; 250/436; 250/437; 250/438

(58) Field of Classification Search ............... 210/748, 210/760, 764, 172.1, 192, 195.1, 195.3, 196, 210/199, 202, 203, 257.1; 250/436, 437, 250/438

See application file for complete search history.

(56) References Cited

U.S. PATENT DOCUMENTS 4,020,352 A * 4/1977 Mahler et al. ............... 250/436
5,897,785 A * 4/1999 Billings ...................... 210/734
6,083,386 A * 7/2000 Lloyd ....................... 210/195.1

FOREIGN PATENT DOCUMENTS

JP 10085771 A * 4/1998
JP 11188373 A * 7/1999

OTHER PUBLICATIONS

Kamei et al.; Machine Translation of JP 11188373 A.*

* cited by examiner

*Primary Examiner*—Matthew O Savage
*Assistant Examiner*—Paul J Durand
(74) *Attorney, Agent, or Firm*—Flynn, Thiel, Boutell & Tanis, P.C.

(57) ABSTRACT

A method for clarifying a sludge, characterized in that a raw waste water is subjected to a solid-liquid separator and then to a primary filtration device, to separate it into a solid material and a liquid material, and the resultant liquid treated material is then treated by a process comprising an ozone treatment and a special light ray treatment.

5 Claims, 5 Drawing Sheets

(a)

(b)

(a)

(b)

METHOD FOR THE CLARIFICATION OF SLUDGE

FIELD OF THE INVENTION

The present invention relates to a method for the clarification of a sludge, for example, wash water from a pigshed, a cowshed or a chicken house, or waste wash water from a butchery, or waste water from a food-processing factory, and clarification equipment therefore.

DESCRIPTION OF THE PRIOR ART

In Japan, from approximately 10 years ago, the pollution of ground water is becoming very serious. Further, the pollution of rivers are also becoming worse. By a river environment improving campaign of some volunteer parties, several polluted rivers are becoming improved, however, the environmental improvement of the rivers is limited and has not progressed as well as desired.

In particular, the pollution of groundwater is a serious problem at the present time. Nitrogen compounds penetrate into the ground water and spontaneously decompose and form nitric nitrogen, and we are using the ground water as life water.

When nitric nitrogen invades into the human body, it spontaneously decomposes and forms nitrous nitrogen and the formed nitrous nitrogen invades into human blood, hinders the movement of hemoglobin in the blood and causes a problem of lack of oxygen for a human and further forms a carcinogenic compound. W.H.O. (World Health Organization) regulates a standard value of 10 $mgNO_3$—N/L. Further, the standard value of Japan is settled to the same value as the W.H.O., however, in Japan, there are a number of regions where the value of the ground water exceeds the standard. The main reason for the pollution of the ground water is considered to be caused by the agricultural environment.

The agriculture of Japan today is summarized as a problem of excess nitrogen. Among the agricultural fields, the treatment of the excrement of domestic animals is the biggest problem. Since the improvement of ground water pollution is the fundamental object to keep our daily life, it is the most urgent business for us to develop the best suited means which can solve said object.

As the conventional method for the treatment of the excrement of domestic animals, the underground infiltration method, biological treatment and penetration membrane treatment can be mentioned as main methods. The underground infiltration method is the same as the discharge and is a main origin of the ground water pollution. Regarding the biological treatment, fungi do not always work through a year. Further, the color of urine does not discolor. Especially, people working in domestic animal breeding fields, feed fodder by mixing medicines in it. For the purpose of protecting against infection, water with disinfectant is used as a washing water for a cattle shed. Since chemicals are mixed with excrement, biological treatment cannot be a dissolving method. Regarding the treating method by a penetration membrane, the treating amount is low and cost for treatment becomes too high, therefore, this method cannot be used as an actual method. Accordingly, now-a-day, the excrement of domestic animals and waste water after cattle shed washing are discharged on the ground.

In a food processing factory, the treatment of waste water has a problem. For example, the treatment of waste fluid with coffee dregs, which is a by-product of a coffee production process or treatment of canned coffee after a relishing period, are not solved problems. Especially, in canned coffee after a relishing period, sugar, antioxidants or flavors are contained and a method for the treatment of these compounds is not accomplished. Samely, the treatment of canned or bottled green tea, red tea or cola are also serious problems. Further, regarding the treatment of waste fluid from a Shochu (Japanese spirits) production process, a method of treatment is quite in the dark. Waste fluid from a Sake production process is similar. Some of them are treated by a digestion tank method, which is popular in the treatment of waste water from a butchery, however, the capacity of the method is full and cannot entirely satisfy the demands.

SUMMARY OF THE INVENTION

The present invention provides a method for the clarification of a waste fluid from a cattle shed containing the excrement of domestic animals or from a food-processing process, which are the main origins of groundwater pollution, by a physical method without using chemicals or biological treatment and, further, the costs for equipment and treatment can be reduced.

The essential point of the present invention is a method for the clarification of a sludge comprising the steps of separating a waste fluid•raw solution to solids and a liquid by a solid-liquid separator and a first filtration apparatus and then treating the obtained liquid state-treated product by a process containing an ozone treatment and a specific ray treatment.

BRIEF ILLUSTRATION OF DRAWINGS

DESCRIPTION OF THE PREFERRED EMBODIMENT

Figure 1:
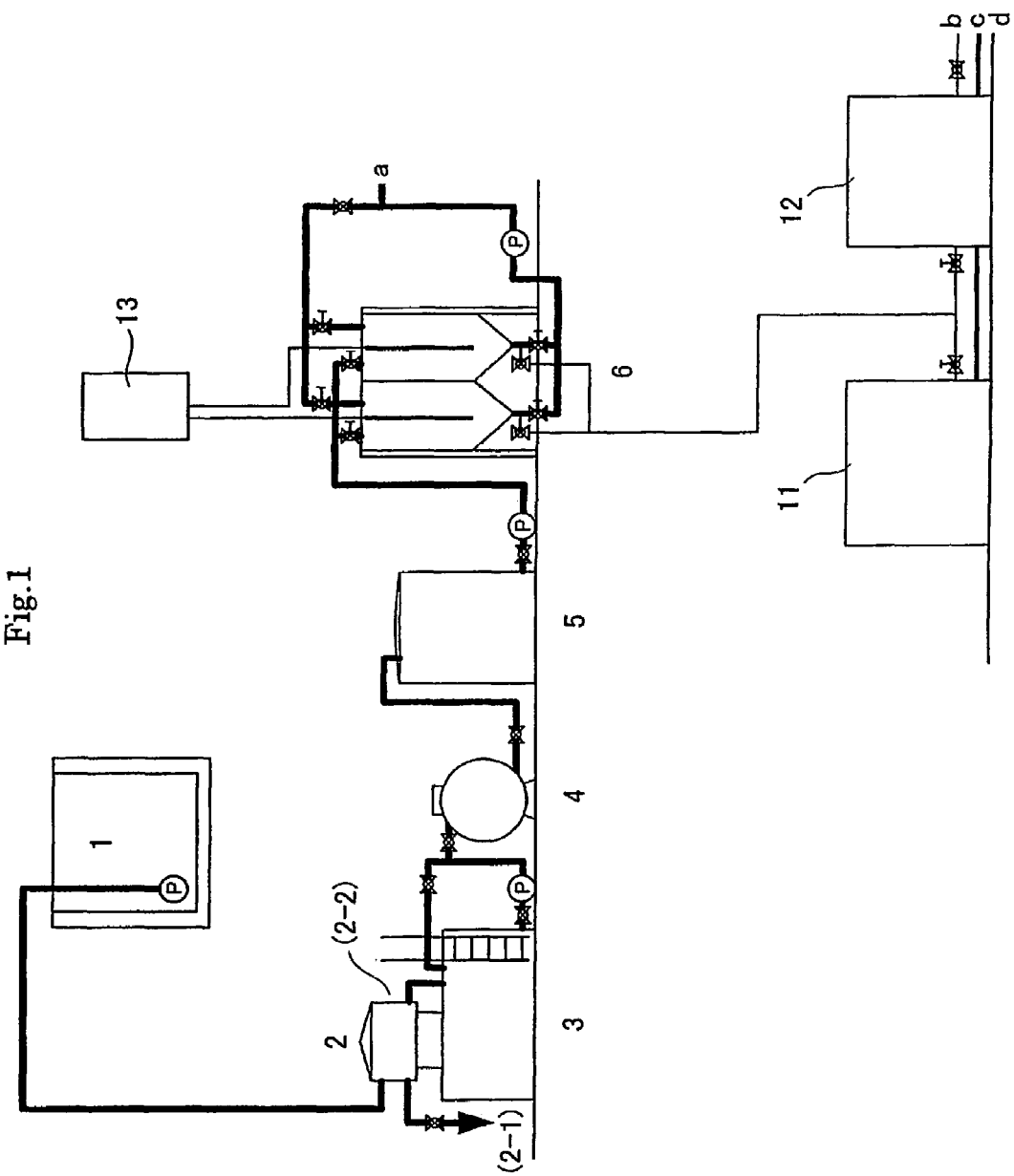
FIG. 1 and FIG. 2 are illustrating views of a treatment of excrement from a pigshed.

The present invention will be illustrated more in detail.

In the present invention, the terms "waste fluid" and "raw solution" indicate a liquid which can be a source of sludge or pollution, specifically said terms indicate waste wash water from a cattle-shed, the urine of domestic animals, wastewater from food processing or waste water from a butchery. Further, said terms indicate waste canned coffee of an over relishing period, waste fluid from a Shochu production process, waste fluid from a Sake production process or waste fluid from all other beverage production processes. The present invention is a method for the clarification of these waste fluid•raw solution to the admitted environmental standard value level.

In the present invention, a waste fluid•raw solution is separated into solids and liquids by a solid-liquid separator, and the separated solids are used as an organic fertilizer or as a soil conditioner.

The separated liquid is treated by an ozone treatment under the following conditions. That is, ozone is added to a waste fluid•raw solution by 3.0 $Nm^3/H$ flow rate at a normal temperature. The flow rate of ozone to be added can be changed according to the shape or capacity of a tank. For example, by 1.2 $Nm^3/H$, 1.5 $Nm^3/H$-8.0 $Nm^3/H$ or by 0.3 $Nm^3/H$-9.0 $Nm^3/H$. For the purpose of improving the effect of the ozone reaction, the shape of the reaction tank is designed so that the raw solution can easily flow by convection. Further, ozone is added from a lower position of the reaction tank and, for the purpose of improving the reaction effect, an ozone discharging nozzle is processed to have a star-like shape. By processing the discharging nozzle to have a star-like shape, ozone bubbles are generated more finely and enter between particles of the solution so as to accelerate the ozone reaction. Although the time necessary for the ozone treatment changes according to the amount of the solution to be treated, however, it is approximately from 30 to 90 minutes.

Specific rays are irradiated into a waste fluid•raw solution which is treated by ozone treatment. The wavelength of the specific rays differs slightly according to the power of the source, and the irradiation of ultraviolet rays of 165 nm-225 nm wavelength or near-ultraviolet rays of 225 nm-350 nm is carried out. Although the irradiation time differs according to the kind of waste fluid•raw solution, it is approximately from 60 to 90 minutes. By this irradiation, various fungi contained in the stock solution are sterilized and pigments contained in the stock solution decompose.

Either ozone treatment or specific ray treatment can be carried out first, or ozone treatment or specific ray treatment can be carried out alternatively and repeatedly. As a method for specific ray irradiation treatment, a raw urine liquid is sprayed in a mist or fog, or a wet wall method can be used too. Or, a raw urine liquid can be introduced from a lower position of a specific ray treatment tank, which is specially processed, and can be reacted with irradiation by flowing to an upper side by a back eddy method using flowing water of 40 L/min. Further, ozone treatment or specific ray treatment can be carried out simultaneously by using a specially processed reaction tank. In order to remove a decomposed or extracted product formed by the ozone or specific ray treatment, the liquid after the ozone or specific ray treatment is passed through a filtering apparatus. As a filter, activated carbon, clay, zeolite or sand can be used.

The above-mentioned process is shown by a flow sheet in Table 1 and is illustrated more in detail.

TABLE 1

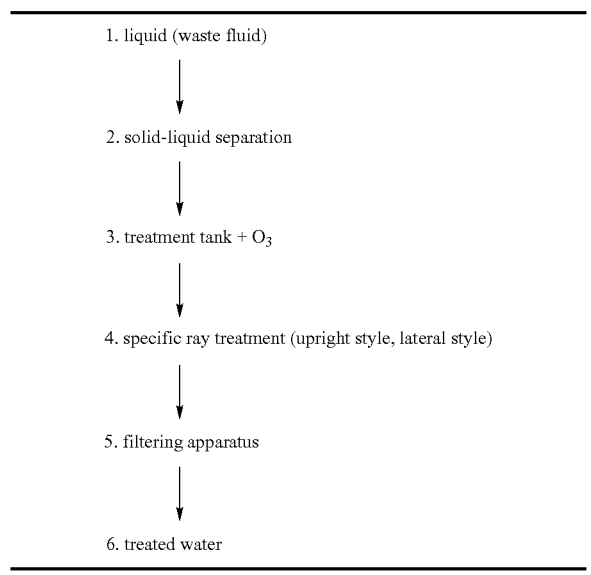

1. liquid (waste fluid)

2. solid-liquid separation 3. treatment tank + O₃

4. specific ray treatment (upright style, lateral style)

5. filtering apparatus 6. treated water

1. Introduce a liquid (waste fluid) which contains solids.

2. As the first step, said liquid is separated to a liquid part and a solids part. As a method of separation, any kind of centrifuge, screen separator or separator by difference in specific gravity can be used. By a separator, since a complete separation of 100% is impossible, the liquid after separation (waste fluid) is filtrated. As the method for filtration, a filter press, screw press, natural filtration, suction filtration or vacuum filtration can be used. The separated solids are used as a soil conditioner.

3. The liquid, after the solids are removed (waste fluid), is transferred to a treatment tank. By passing through a specially processed liquid•ozone gas mixing device, which is equipped at the lower position of the treatment tank, fine mixing of the liquid and ozone is carried out (refer to FIG. 3). The liquid is in a suitable state to decompose easily by an ozone reaction and by the next process step. During the reaction, the liquid is stirred by a stirrer equipped to the top of the tank. When the rotating speed of the stirrer is fixed to 150-300 r.p.m., a good reaction effect can be accomplished.

4. A liquid (waste fluid) which is treated by ozone treatment is transferred to a specific ray treatment chamber. An upright style chamber or lateral style chamber can be mentioned as a specific ray treatment chamber and an easier type for use can be selected according to the place where the chamber is set (refer to FIG. 5). A spiral-shaped liquid guide plate of 50 pitches from entrance to exit is set up to inside of the chamber and the liquid (waste fluid) to be treated is discharged by rotating. A ray source lamp is set up in the inside of the chamber. The number of ray source lamps can be changed according to the quantity of liquid (waste fluid) treated. For example, when the quantity of liquid to be treated is 10 t/day, the number of ray source lamps is 12 and when the quantity of liquid to be treated is 20 t/day, the number of ray source lamps is 21. That is, it can range from a small quantity to a large quantity. The liquid is decomposed by the ray having a specific wavelength mentioned above by rotating and becomes harmless and is discharged from an outlet.

5. The liquid (waste fluid) after the ray treatment is filtered. As a method of filtration, a filter press, screw press, natural filtration or vacuum filtration can be used. As a filter, activated carbon, activated clay, zeolite or diatomaceous earth can be used.

6. After all of these steps have been completed, all standards based on "Water Pollution Control Law" are cleared and it becomes possible to discharge the liquid from an outlet. Further, the liquid (waste fluid) after being treated can be used as washing water in a factory.

Example

Figure 2:
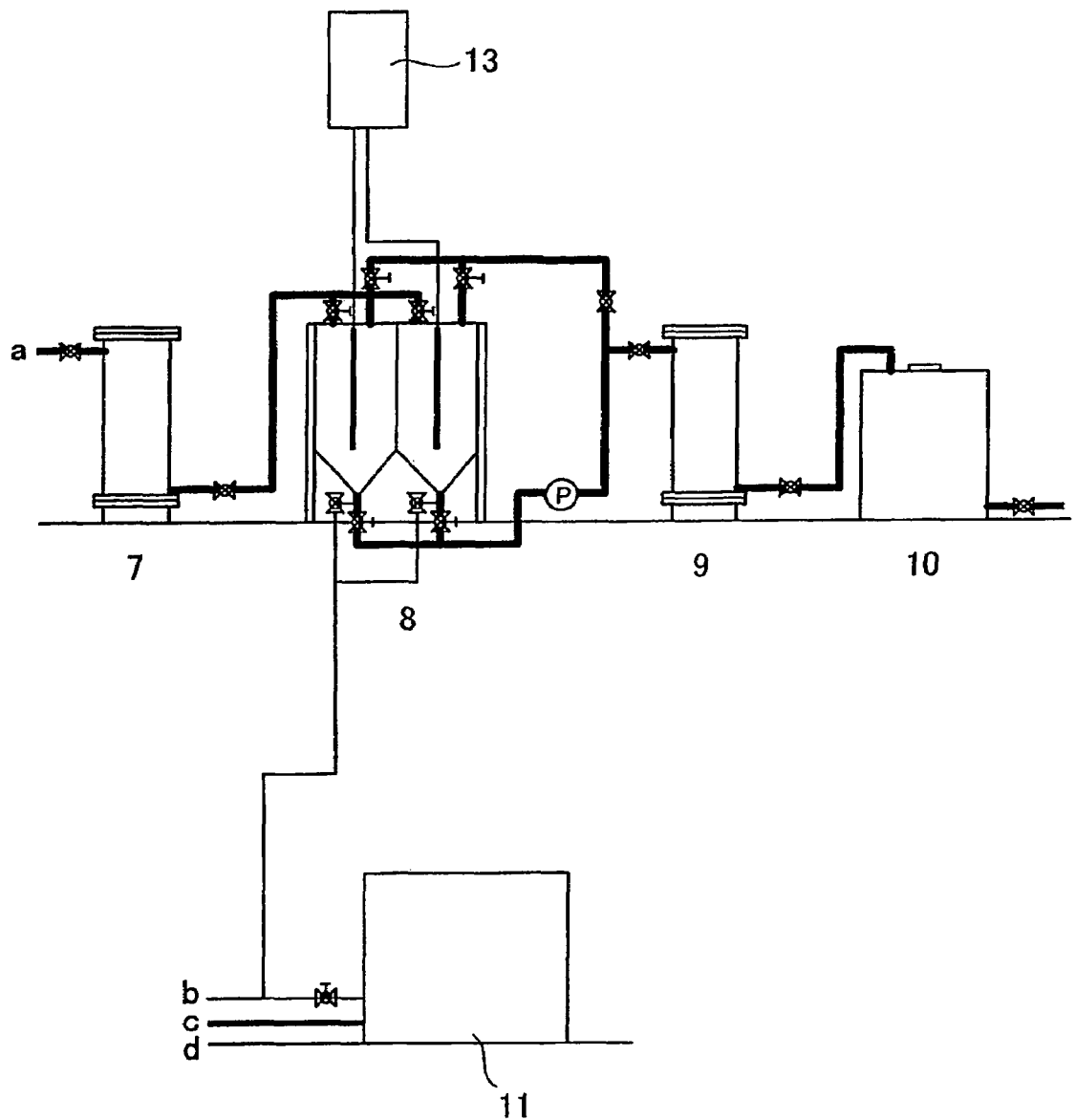

As an Example of the present invention, the treatment of excrement from a pigshed shown in FIG. 1 and FIG. 2 is illustrated. This example is characterized in that ozone treatment and specific ray treatment are carried out simultaneously (end parts of pipe a, b, c and d of FIG. 1 are joined with a, b, c and d of FIG. 2).

(1) Raw Excrement Tank

Excrement from a pigshed and wash water from a pigshed are gathered together in a raw excrement tank (1), which is buried underground. The gathered raw excrement is pumped up and transferred to a solid-liquid separator (2).

(2) Solid-Liquid Separating Apparatus

The liquid transferred from the underground stock tank is separated into a solids part and a liquid part by a solid-liquid separator (2) which rotates at a high speed. The solids part is discharged from an outlet (2-1) and recovered as a soil conditioner whose nitrogen content is small by a separating process. The liquid part is discharged from an outlet (2-2) and transported to No. 1 tank (3).

(3) No. 1 Tank

No. 1 tank is a tank to be used as a stocker in which the liquid part, after solid-liquid separation, is stored.

(4) No. 1 Filtering Apparatus

To remove small solids which cannot be separated by solid-liquid separating apparatus (2), the liquid is passed through No. 1 filtering apparatus. The filter used in No. 1 filtering apparatus (4) is zeolite.

(5) No. 2 Tank

After passing through No. 1 filtering apparatus, the liquid part of the excrement is recovered in No. 2 stock tank (5).

(6) First Treatment Apparatus

The recovered liquid part of the excrement in No. 2 stock tank (5) is transported to first treatment apparatus (6). First treatment apparatus (6) carries out ozone treatment and specific ray irradiation treatment simultaneously. The first treatment apparatus (6) consists of two reaction tanks which are formed to have an inclination of 35 degrees from the lower third of the tanks to the bottom of the tanks. The liquid part of the excrement transported from tank No. 2 is poured into these 2 tanks and fill the tanks. Specific ray irradiation is carried out simultaneously with ozone being blown in. In order to improve the effect, the liquid part of the excrement is stirred. A stirrer is equipped with a propeller or a wire brush which are processed to have a sawteeth shape at a pointed end of it and pulverize the liquid part of the excrement to fine particles. At the bottom of the reaction tank, there is a nozzle to blow in ozone, which is processed to have a star-shape, and ultra-fine bubbles of ozone is blown in from the nozzle and mixed with ultra-fine particles of the liquid part of the excrement. Thus, ultra-fine bubbles of ozone are mixed with ultra-fine particles of the liquid part of the excrement and thus the reaction is accelerated.

The purpose of this process is to clarify the raw excrement by 60-70%.

(7) No. 2 Filtering Apparatus (This Process and After This Process are Shown in FIG. 2)

After the first treatment is over, the liquid part of the raw excrement is transported to No. 2 filtering apparatus (7). Impurities which are separated and extracted at the first treatment (for example, nitrogen compounds, phosphorus compounds or particles of pigment) are removed. The filter used in this process is a fine powder of activated carbon. As the other filters which can be used, clay or calcined zeolite can be mentioned.

(8) Second Treatment Apparatus

The liquid part of the excrement (7) which has passed through No. 2 filtering apparatus is transferred to a second treatment apparatus. The shape of the reaction tank of this apparatus is the same as that of the first treatment apparatus. The purpose of this process is to clarify the balance of the 30-40% of raw excrement which is not clarified by the first treatment apparatus. Further, the method for treatment is the same as that of the first treatment. That time for treatment of this process is approximately 60 minutes.

The treating processes of the first and the second treatments are the same, however, if the first treatment covers the second treatment, the time for treatment becomes 6 hours longer and the clarification ratio is not so good. By dividing to first and second treatments, the reaction can be carried out surely, the time for treatment can be shortened and the treating capacity can be improved.

(9) No. 3 Filtering Apparatus

After the second treatment is over, the liquid part of the excrement is filtered by No. 3 filtering apparatus (9). In this process, impurities which are decomposed and extracted at the second treatment are removed. The filter which is used in this process is 50% of a fine powder of activated carbon and 50% of calcined zeolite. Further, clay or others can be used.

(10) No. 3 Tank

Tank No. 3 (10) is a tank for storing the liquid part of excrement which passed through No. 3 filtering apparatus (9). Since the treated water stored in this tank is water which satisfies the environmental standard value, it is possible to discharge the water into a river. In the present invention, this treated water is reused as washing water for a pigshed.

In the drawings, (11) indicates an ozone generating device and (12) indicates an oxygen generating device. Ozone which is generated in the ozone generating device is supplied to the first and second treating apparatuses. Further, (13) is a specific ray device and by rays generated in this device, raw excrement in the first and second treating devices are irradiated.

The results after being treated by the above-mentioned treatments are shown in Table 2.

TABLE 2

| Items | Water Pollution Control Law | before treatment | after treatment |
|---|---|---|---|
| hydrogen ion conc. pH | 5.8-8.6 pH | 5.1 (18° C.) pH | 5.1 (18° C.) pH |
| amount of suspended solid mg/L | 200 mg/L | 150 mg/L | 4.9 mg/L |
| biological oxygen demand mg/L | 160 mg/L | 8000 mg/L | 30 mg/L |
| chemical oxygen demand mg/L | 160 mg/L | 2700 mg/L | 20 mg/L |
| nitrogen content mg/L | 120 mg/L | 2200 mg/L | 60 mg/L |
| phosphorous content mg/L | 16 mg/L | 240 mg/L | 10 mg/L |
| *escherichia coli* Mg/L | 3000 /L | not measured | not detected |

Figure 3:
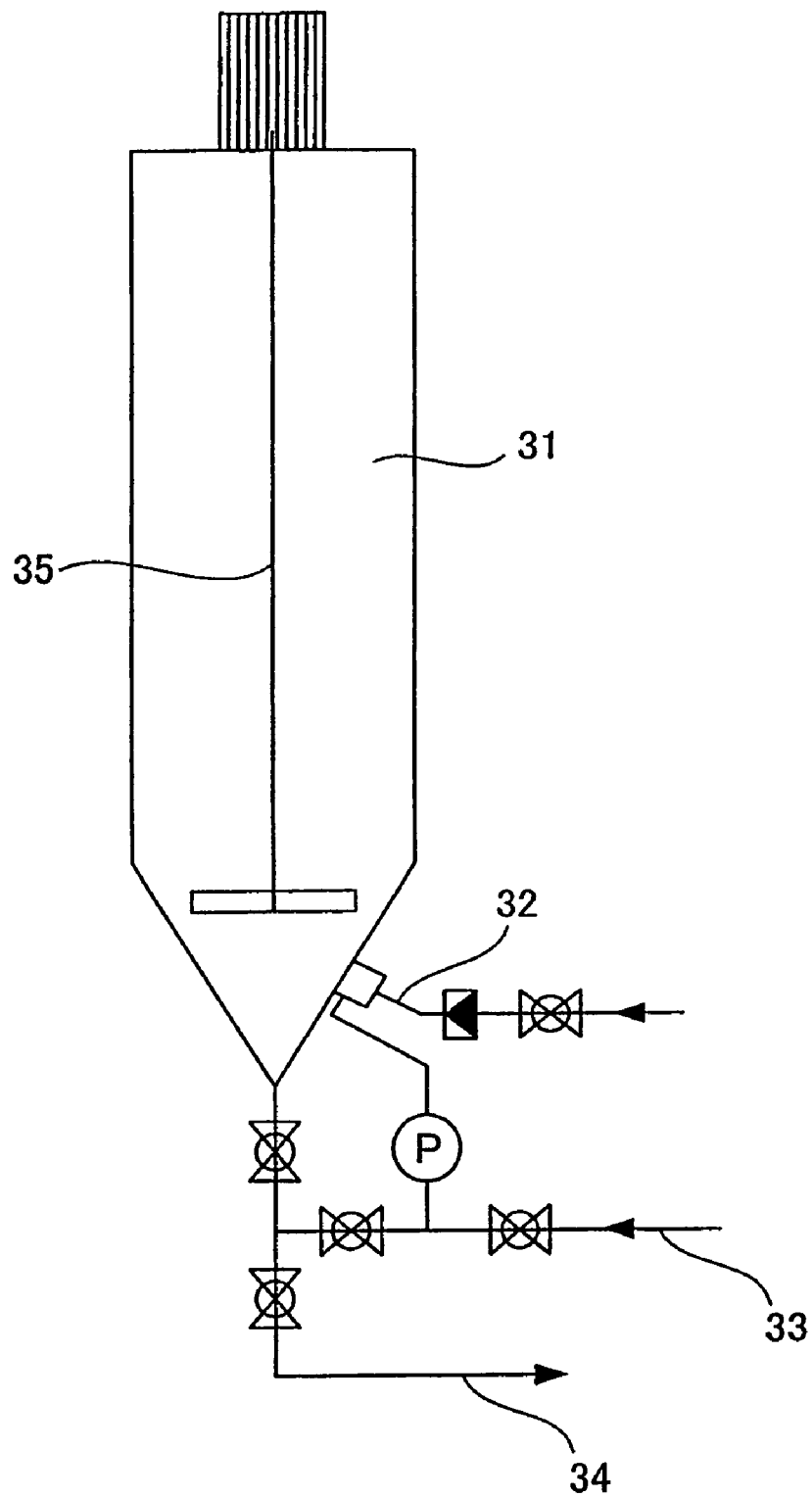
FIG. 3 and FIG. 4 are illustrating views of ozone treatment.

Secondarily, one example of an ozone treating apparatus to be used in the present invention is illustrated according to FIG. 3. As shown in FIG. 3, a stirrer 35 is equipped at the center of the inside of tank 31, the object to be treated is introduced from a lower position of the tank through a pipe 33, for example, from a ray treatment apparatus and lead to the top of the tank. Ozone, which is lead through pipe 32 from the ozone generating device, is introduced to a lower position of the tank and contacts with said object to be treated countercurrently and to treat it. The treated object is introduced to the next second treatment apparatus through pipe 34.

Figure 4:
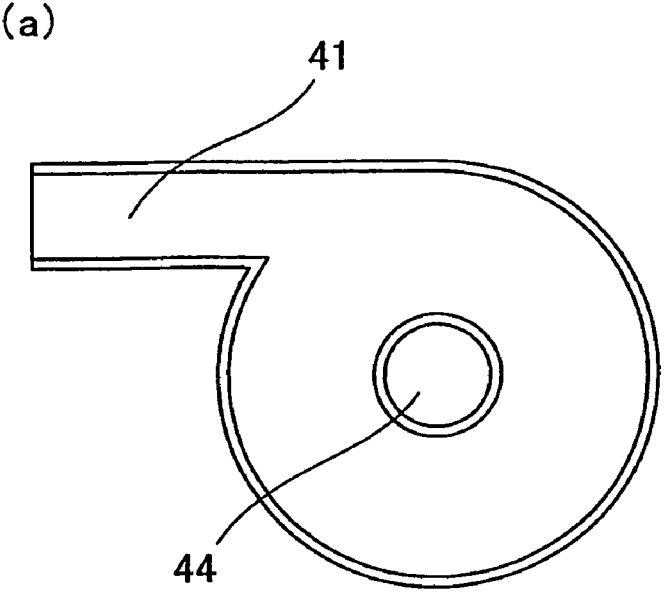
Figure 4:
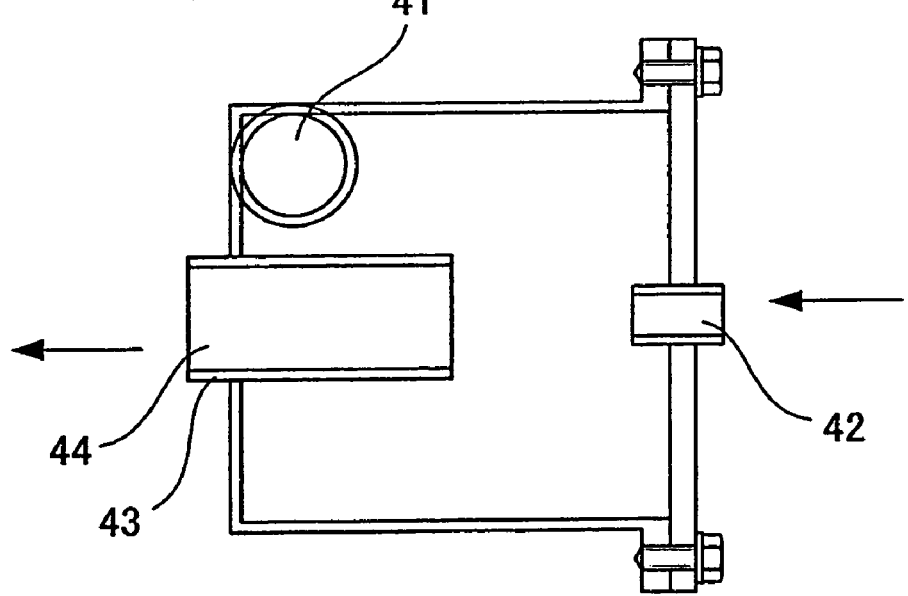

FIG. 4 shows another example of an ozone treating apparatus used in the present invention. (a) is a front view and (b) is a side view. From an inlet 41 equipped at one end of a cylindrical lateral style tank, the object to be treated is introduced and flows in the tank drawing spiral locus toward another end. In the center of another end there is an ozone inlet 42, from where ozone is introduced, contacts with the object to be treated and the treated product 43 is discharged from an outlet 43 located at the center of the tank.

Figure 5:
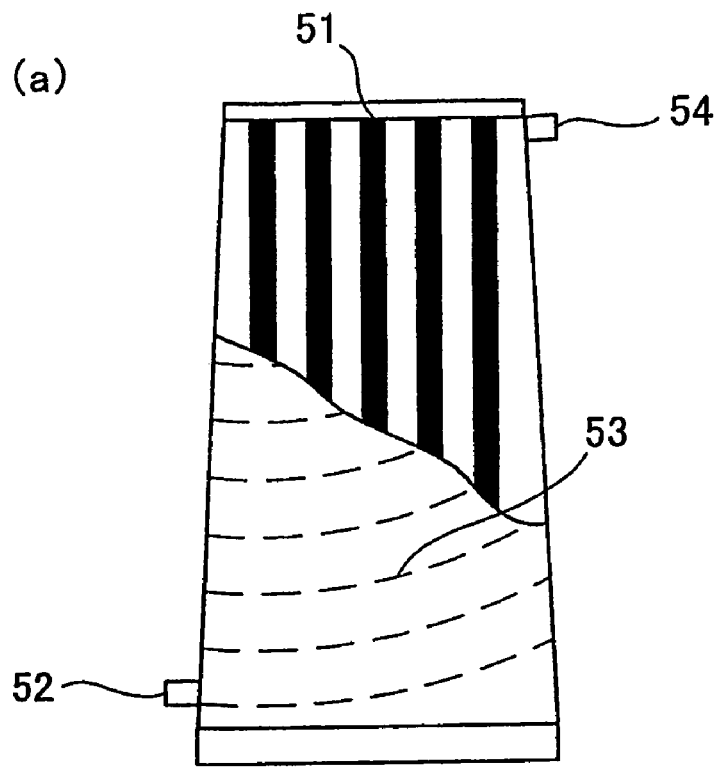
FIG. 5 is an illustration view of a ray treating chamber, wherein, (a) is an upright style chamber and (b) is a lateral style chamber.
Figure 5:
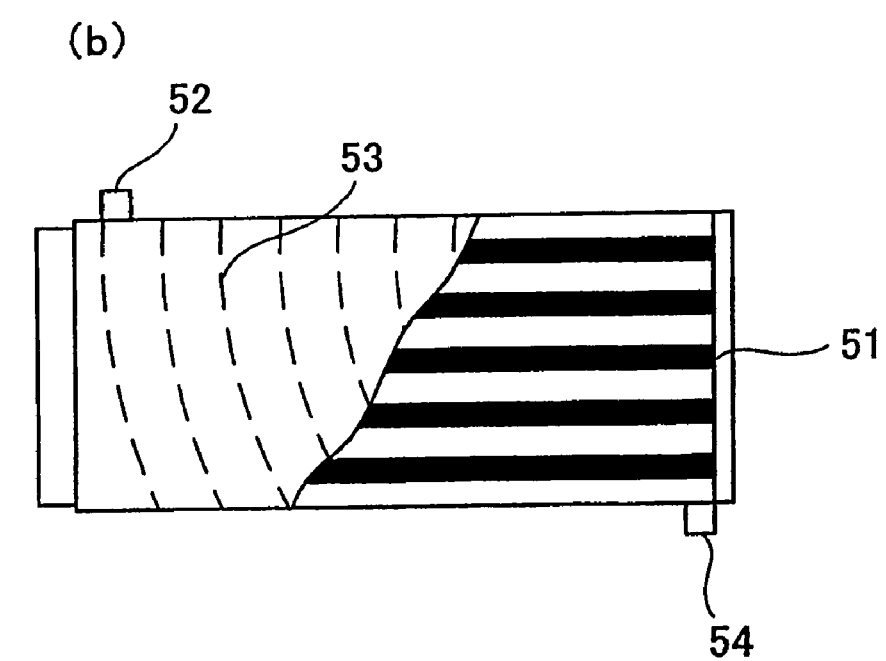

FIG. 5 is an illustration view of a ray-treating chamber, wherein, (a) is an upright style chamber and (b) is a lateral style chamber. As shown in FIG. 5, in the chamber, ray lamps 51 are arranged in parallel and, among each ray lamp, a guide plate 53 is arranged spirally. The object liquid to be treated is introduced from entrance 52, flows along the guide plate 53, irradiated by ray lamp 51 and discharged from outlet 54. Then, it is transported to the next process.

APPLICABILITY FOR INDUSTRIAL USE

As mentioned above, since the present invention does not use chemicals at all, a secondary waste product is not formed. Further, the sludge is clarified by physical treatment, that is, ozone and specific ray treatments so that equipment investment and treatment costs can be reduced.

The invention claimed is:

1. A method for clarifying a sludge, comprising the steps of:
   recovering a discharged waste sludge;
   separating the discharged waste sludge into a solids fraction and a liquid fraction in a solid-liquid separation unit;
   recovering the liquid fraction from the solid-liquid separation unit;
   passing the recovered liquid fraction through a first filtration apparatus to obtain a first filtrate and a first solids residue;
   recovering the first filtrate from the first filtration apparatus;
   simultaneously ozonizing the first filtrate and irradiating the first filtrate directly with a specific ray to obtain a first treated liquid;
   recovering the first treated liquid;
   passing the first treated liquid through a second filtration apparatus to obtain a second filtrate and a second solids residue;
   recovering the second filtrate from the second filtration apparatus;
   simultaneously ozonizing the second filtrate and irradiating the second filtrate directly with the specific ray to obtain a second treated liquid;
   recovering the second treated liquid; and
   passing the second treated liquid through a third filtration apparatus to obtain a product liquid.

2. The method for clarification of sludge according to claim 1, wherein the specific ray is a ray which has a wavelength of the range from the ultraviolet ray region to the near-ultraviolet ray region.

3. The method for clarification of sludge according to claim 1, wherein the discharged waste sludge is wash water from a pigshed, a cowshed or a chicken house, or waste wash water from a butchery, or a processed foods liquid of an over relishing period.

4. The method for clarification of sludge according to claim 1, wherein solids obtained by the solid-liquid separator and the first filtration apparatus are used as a soil conditioner.

5. A system for clarifying a sludge, comprising
   a solid-liquid separation unit for separating a discharged waste sludge into a solids fraction and a liquid fraction;
   a first filtration apparatus for separating the liquid fraction into a first filtrate and a first solids residue;
   a first treatment apparatus for simultaneously ozonizing the first filtrate and irradiating the first filtrate directly with a specific ray to obtain a first treated liquid;
   a second filtration apparatus for separating the first treated liquid into a second filtrate and a second solids residue;
   a second treatment apparatus for simultaneously ozonizing the second filtrate and irradiating the second filtrate directly with the specific ray to obtain a second treated liquid; and
   a third filtration apparatus for separating the second treated liquid into a product liquid and a third solids residue, wherein said first and second treatment apparatuses each comprises specific ray lamps provided parallel to each other and a guide plate for flowing the first and second filtrates in a spiral manner between the specific ray lamps.

* * * * *